R. B. FAGEOL.
VEHICLE.
APPLICATION FILED MAY 3, 1916.
1,226,960.
Patented May 22, 1917.
2 SHEETS—SHEET 2.
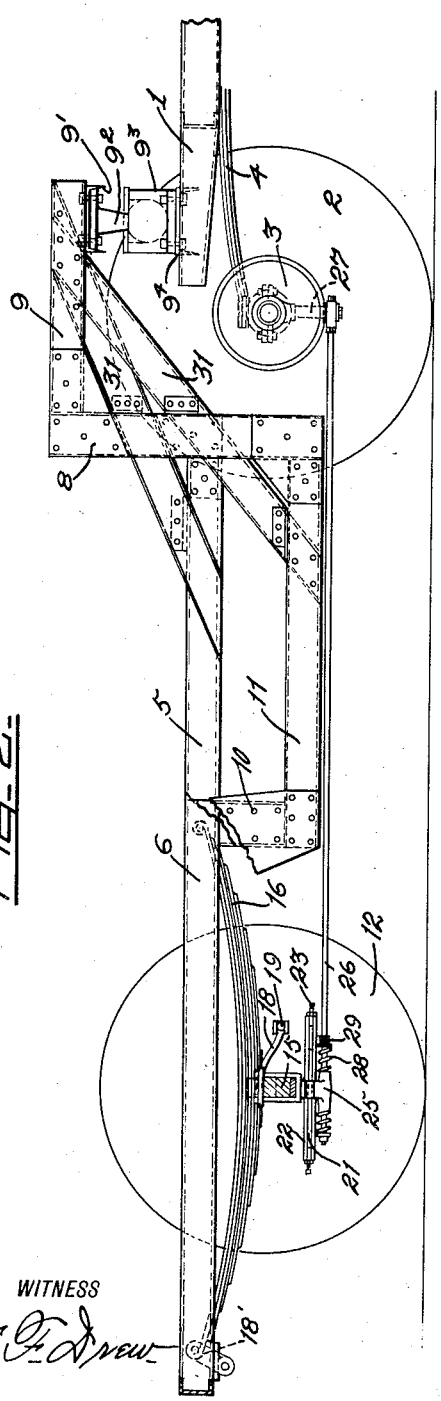
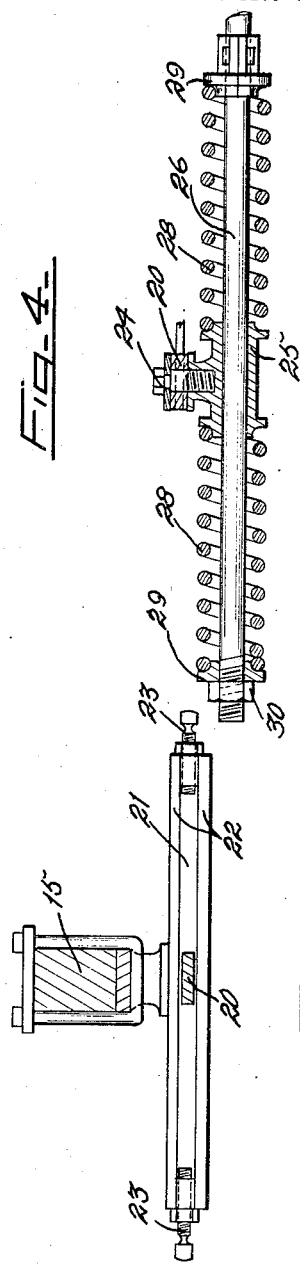
WITNESS
INVENTOR
BY
ATTORNEYS

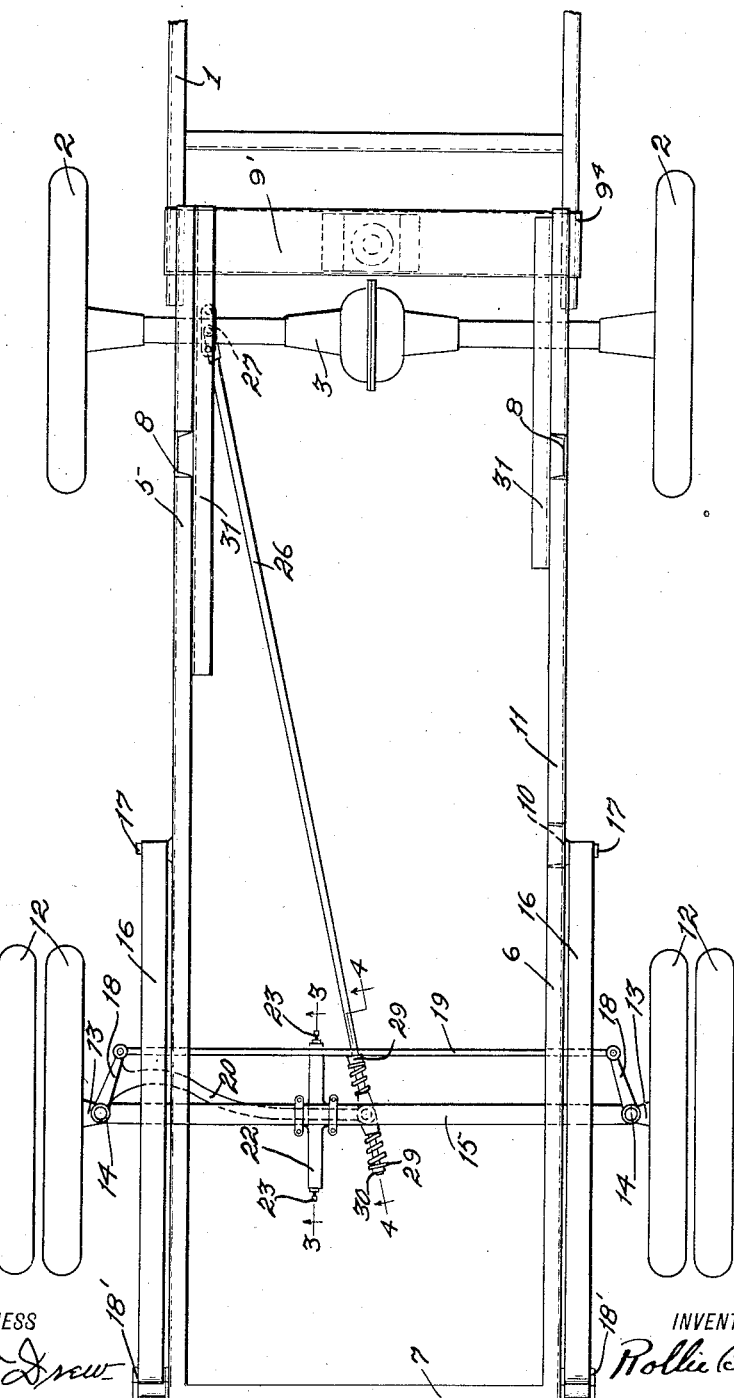

UNITED STATES PATENT OFFICE.

ROLLIE B. FAGEOL, OF OAKLAND, CALIFORNIA.

VEHICLE.

1,226,960.  Specification of Letters Patent.  Patented May 22, 1917.

Application filed May 3, 1916. Serial No. 95,131.

*To all whom it may concern:*

Be it known that I, ROLLIE B. FAGEOL, a citizen of the United States, residing at Oakland, in the county of Alameda and State of California, have invented certain new and useful Improvements in Vehicles, of which the following is a specification.

The present invention relates to vehicles and more particularly to a vehicle trailer adapted to steer or follow in the path of the propelling vehicle to which it is attached.

The invention consists broadly in providing a vehicle trailer pivotally supported at one end by a propelling vehicle and provided adjacent its opposite end with a pair of supporting wheels capable of pivotal movement on a vertical axis and which are connected through a steering mechanism with the propelling vehicle, whereby on the changing of the course of travel of the propelling vehicle the wheels of the trailer will travel in the same path as the rear wheels of the propelling vehicle.

The invention has for its principal objects to provide a vehicle trailer supported by a single pair of supporting wheels and adapted for use in congested traffic and which will track or trail in the path of the wheels of the propelling vehicle, enabling the operator of the propelling vehicle to closely approach and pass around objects without danger of the wheels of the trailer approaching the objects closer than the wheels of the propelling vehicle; to provide a trailer which is supported at one end by the propelling vehicle and which may be quickly attached to or detached from the same; one which is capable of being drawn forwardly or pushed rearwardly by the propelling vehicle and during its movement in either direction will steer in the path of movement of the propelling vehicle.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in plan of an embodiment of my invention, illustrating the rear end of the propelling vehicle, the trailer supported at one end thereby, and the supporting wheels for the opposite end of the trailer, pivoted to swing on a vertical axis and connected with the propelling vehicle.

Fig. 2 is a view in side elevation of the trailer attached to the propelling vehicle and pivotally supported at its forward end thereby.

Fig. 3 is a detail sectional view taken on line 3—3 of Fig. 1, illustrating more fully the means for limiting the turning radius of the trailer supporting means.

Fig. 4 is a detail sectional view taken on line 4—4 of Fig. 1, illustrating more fully the connection between the steering knuckle and rod for permitting a turning of the supporting wheels of the propelling vehicle in a shorter radius than the trailer supporting wheels.

Referring more particularly to the several views of the drawings, wherein like characters of reference designate corresponding parts, 1 indicates the rear portion of a suitable propelling vehicle frame supported at its rear end by the wheels 2 carried by an axle in the axle housing 3 which is in turn supported by the springs 4 secured to the frame 1 of the propelling vehicle. The trailer vehicle comprises the side frame members 5 and 6, connected at their rear end by the member 7, upwardly bent as at 8 adjacent their forward ends, and forwardly extended, as at 9, to provide a portion adapted to overhang the rear of the propelling vehicle frame and at the same time permitting the main portions of the side frame members to lie approximately parallel with the road surface and in close proximity thereto.

The forward ends 9 are connected by a transverse member 9' and depending from the underside of said member is a ball member $9^2$ for reception in a socket $9^3$ carried by a member $9^4$ connecting the rear ends of the side members 1 of the propelling vehicle. The socket and ball members are positioned in the longitudinal center of their respective frames and provide a supporting pivotal connection between the propelling and trailer members.

To enable the trailer to be used for passenger carrying purposes, and to provide an entrance and exit immediately in rear of the upwardly bent portion 8, and having a low step from the road surface, the side frame member 6 is dropped, as at 10, providing the portion 11 which is at the right side of the trailer and which is an easy step upwardly from the road surface.

Wheels 12 carried by spindles 13 mounted through vertical pivots 14 at the opposite ends of the axle 15 support the rear portion of the trailer. The axle is secured to the leaf springs 16, one of which extends longitudinally of the outer side face of the respective side frame members 5 and 6, said springs being attached at their forward ends to the side frame members, as at 17, and secured at the rear ends thereto through the shackles 18.

The spindles 13 carry steering arms 18 connected by a tie rod 19, and to insure the proper tracking of the trailer supporting wheels with the rear wheels of the propelling vehicle, the pivotal points of the respective spindles and corresponding ends of the tie rod and steering arms are so arranged that a line through the center thereof will intersect at the center of the ball member $9^2$.

A lever 20 is formed integral with one of the steering arms 18 and extends under the axle 15 where it operates in a guide slot 21 formed by the spaced members 22 connected at their ends and supported beneath the axle, as in Fig. 3. The adjusting screws 23 at opposite ends of the guide slot 21 limit the movement of the lever 20 and control the angle of pivot of the spindles 13. The outer end of the lever 20 is pivotally connected by a screw 24 with a tubular guide 25 freely slidable on a steering rod 26 which connects at its opposite end through a vertical pivot with a standard 27 secured to the rear axle housing 3 just inside of the side frame members 1. Coiled springs 28 surrounding the rod 26 abut at one end against the ends of the guide 25 and are maintained under tension by the flanges 29, one of which is retained in position by the nut 30 and the other of which is frictionally clamped to the rod. By connecting the lever and rod as described, the operation of the rod under normal conditions actuates the lever to cause the wheels 15 to trail in the path of the wheels 2, but should the propelling vehicle turn in a shorter radius than that permitted of the rear wheels 15, the screws 24 will arrest the movement of the lever and the rod will slide freely through the tubular guide 25 against the tension of one of the springs.

To strengthen the side frame members, it is preferred that the brace members 31 be employed and that the same extend forwardly at an angle and connect the upwardly projected and forwardly extended portions with the respective side frame members, as in Fig. 2.

Having thus described my invention, what I claim as new and desire to protect by Letters Patent is:—

1. In combination with a wheeled propelling vehicle, a trailer pivotally connected thereto, and supported at one end thereby, a pair of wheels for supporting the other end of said trailer and capable of pivotal movement on a vertical axis, a steering connection extended from said propelling vehicle and coöperating with said trailer supporting wheels to cause the same to track in the path of the propelling vehicle, means for limiting the pivotal movement of said trailer supporting wheels and means associated with said steering connection for permitting movement thereof after the pivotal movement of said wheels has been limited.

2. In combination with a wheeled propelling vehicle, a trailer pivotally connected thereto and supported at one end thereby, a supporting axle carried by the trailer adjacent its opposite end, wheel supporting spindles carrying wheels attached to the opposite ends of said axle and capable of pivotal movement relatively thereto on a vertical axis, a tie rod pivotally connected at its opposite ends to said spindles, and a steering connection extended from said propelling vehicle and directly connected to one of said spindles to cause said wheels to steer in the path of the wheels of said propelling vehicle said connection capable of a limited free movement in excess of the pivotal movement of said spindles.

3. In combination with a wheeled propelling vehicle, a trailer connected thereto by a vertical pivot and supported at one end thereby, a supporting axle carried by said trailer adjacent its opposite end, wheel supporting spindles carried by said axle and connected thereto by a vertical pivot, a rod pivotally connecting said spindles, a lever arm carried by one of said spindles, a steering rod pivotally connected at one end to said propelling vehicle at a point to one side of the pivotal connection of said propelling vehicle and trailer and yieldably connected at its opposite end to said lever arm.

4. In combination with a wheeled propelling vehicle, a trailer connected thereto by a vertical pivot and supported at one end thereby, a supporting axle carried by said trailer adjacent its opposite end, wheel supporting spindles carried by said axle and connected thereto by a vertical pivot, a rod pivotally connecting said spindles, a lever arm carried by one of said spindles, means for limiting the movement of said arm, a steering rod pivotally connected at one end to said propelling vehicle at a point to one side of the pivotal connection of said propelling vehicle and trailer, a tubular member pivotally connected to said lever arm and in which said steering rod is slidably mounted, and spring tension means carried by said rod on each side of said sleeve and contacting therewith.

5. In combination with a wheeled propelling vehicle, a trailer pivotally connected thereto and supported at one end thereby, a pair of wheels for supporting the other end of said trailer and capable of simultaneous pivotal movement on a vertical axis, means for limiting the pivotal movement of said wheels, a steering connection extended from said propelling vehicle and coöperating with said wheels to cause the same to pivot within the confines of said limiting means and to track in the path of the wheels of said propelling vehicle, and means coöperating with said steering connection for permitting a movement thereof after the pivotal movement of said wheels has been arrested.

In testimony whereof I have signed my name to this specification in the presence of the subscribing witness.

ROLLIE B. FAGEOL.

Witness:
    D. B. RICHARDS.